United States Patent [19]

Goldman

[11] 4,248,404
[45] Feb. 3, 1981

[54] DUAL SEAL BUTTERFLY VALVE

[75] Inventor: Holliday L. Goldman, Red Lion, Pa.

[73] Assignee: Allis-Chalmers Corporation, Milwaukee, Wis.

[21] Appl. No.: 65,222

[22] Filed: Aug. 9, 1979

[51] Int. Cl.³ .............................................. F16K 1/22
[52] U.S. Cl. .................................... 251/307; 251/175
[58] Field of Search ................ 251/175, 307, 306, 173

[56] References Cited

U.S. PATENT DOCUMENTS

| | | | |
|---|---|---|---|
| 1,740,041 | 12/1929 | Schmidt | 251/307 X |
| 2,883,149 | 4/1959 | Fiorentini | 251/306 |
| 3,583,668 | 6/1971 | Nelimarkka | 251/306 X |
| 3,642,248 | 2/1972 | Benware | 251/175 X |

FOREIGN PATENT DOCUMENTS 948379 8/1956 Fed. Rep. of Germany ........... 251/306

Primary Examiner—Harold W. Weakley
Attorney, Agent, or Firm—Robert C. Jones

[57] ABSTRACT

A wafer type butterfly valve having a spherical segment body interior contoured to receive a disc seal having upstream and downstream seals. The seals are configured to fit disc grooves and are curved to fit the body contour. Mechanical retainers are provided and there is provision for adjustably applying pressure to the seals.

1 Claim, 4 Drawing Figures

DUAL SEAL BUTTERFLY VALVE

The invention pertains to butterfly valves.

Butterfly type valves utilize a disc valve member carried by an operating shaft which normally effects movement of the disc through substantially 90° between closed and open positions. Various sealing arrangements have been adopted in an attempt to provide complete shutoff of the valve; that is, to minimize leakage from the upstream side through the downstream side of the valve. A common type of seal employs a resilient seat into which the valve disc is driven when in a closed position. However, it encounters with leakage around the closed shafts since the surface of the disc is on its periphery and in line with the disc shaft. Another approach is exemplified in U.S. Pat. No. 3,532,321 wherein a pair of L-shaped resilient members which have tapered knife like contact edges. This arrangement does not seat well since the contact or sealing edges of the seals are extremely thin and subject to a high degree of wear and cannot withstand a great deal of pressure.

It is the general object of the present invention to provide a butterfly valve which incorporates a seal member of a resistive configuration which is sufficiently strong enough for substantially a complete leak-free, shut-off condition.

Another object of the present invention is to provide a butterfly valve having a novel disc and dual seal arrangement which is sufficiently strong enough to resist compression.

Still another object of the present invention is to provide a butterfly valve having a novel disc valve configuration in which dual seals are arranged.

Another object of the present invention is to provide a butterfly valve in which the pressure of the disc seals can be adjusted as required.

Yet another object of the present invention is to provide a butterfly valve in which the disc seals are easily replaced.

DESCRIPTION OF THE INVENTION

Figure 1:
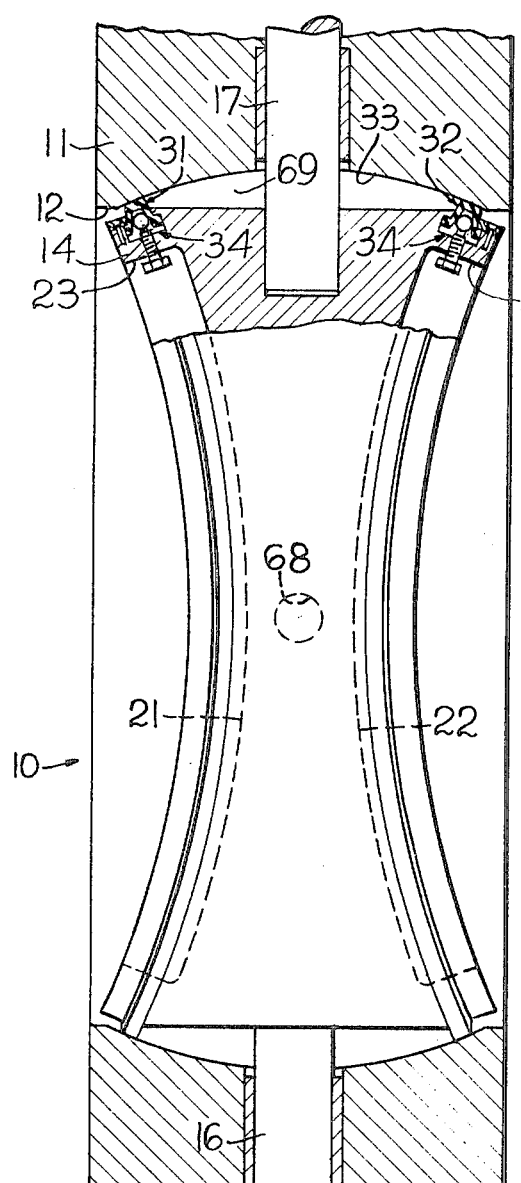
FIG. 1 is a view in cross section through a butterfly valve in which the present invention is incorporated.
Figure 4:
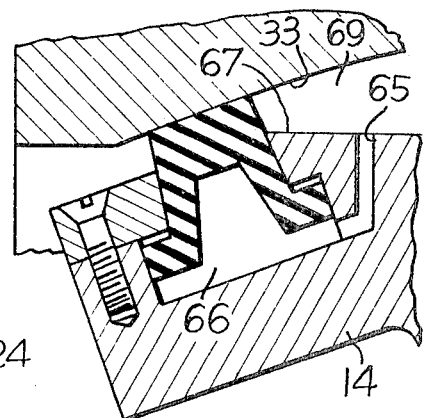
FIG. 4 is an enlarged fragmentary view of a portion of the seal similar to FIG. 2, but with the seal pressurizing wire and screw arrangement replaced by fluid pressurizing means.
Figure 2:
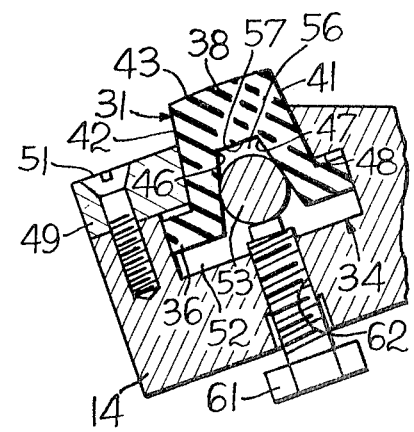
FIG. 2 is an enlarged fragmentary view of the disc and showing the construction and arrangement of one of the seals which is typical of both seals.

A butterfly valve 10 is disclosed having a valve body 11 having a fluid flow through passageway 12. A movable valve disc 14 is pivotally mounted within the passageway 12 on a trunnion shaft 16 and a drive shaft 17 and is positionable to a closed position as depicted in FIG. 1 in which the passageway 12 is completely blocked to prevent the flow of fluid through the passageway 12.

The valve disc 14 is rotated by drive means, not shown, which is well known to those skilled in the valve art, and forms no part of the present invention.

The valve disc 14 is concave on the upstream and downstream sides as at 21 and 22 to provide peripheral edge walls 23 and 24.

The disc 14 receives a pair of disc seals 31 and 32 which are identical and the description of seal 31 will apply to the seal 32 and like parts will be identified with the same reference member. As shown, the interior of the valve body 11 is configured so as to present a spherical segment contour as at 33 to receive the disc seals 31 and 32. To receive the seals 31 and 32, both peripheral edges of the disc are formed with peripheral grooves 34. The grooves 34 are each constructed to present in cross section an open-sided T-shaped configuration. The seals 31 and 32 are configured to present laterally extending circular body portion 38 presenting tapering side walls 41 and 42 terminating at a flat peripheral surface 43. The interior of seal 31 is also formed with inwardly tapering wall surfaces 46 and 47. The seals 31 and 32 are shaped to fit the disc grooves 34 and curved to accommodate the body contour. Maintaining the seals in operative position is simply and easily accomplished by reason of the inner laterally extending flange portion of each of the seals 31 and 32 fitting within the annular recess 48 formed when constructing the one-sided T-shaped groove. The other or outwardly extending flange 36 of the seals is confined by means of an annular retainer ring 49 which is preferred to be fabricated of stainless steel. Screw fasteners 51 serve to maintain the retainer ring 51 in seal securing position.

Figure 3:
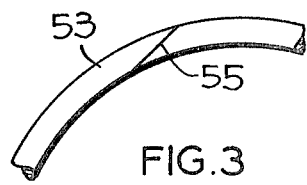
FIG. 3 is a view of the split seal pressurizing wire.

As shown, the groove 48 and the groove 52 are constructed to provide for limited movement of the seals in the groove towards or away from the contoured surface 33 of the valve body against which the flat surface 43 of the seal engage in sealing relationship. Thus, with the arrangement shown, pressure can be applied to the seals to urge the surfaces 43 into intimate seal contact with the contour surface 33. To this purpose, a steel wire 53, of a corrosion resistant material such as stainless steel of which is sufficiently hard to resist deformation is disposed within the backside groove or recess 56. The wire ring 53 has a diameter sufficiently large enough to make contact with the tapered wall surfaces 46 and 47 but is not sufficiently small enough to enter the groove 56 completely. Thus, the wire ring 53 does not contact the surface 57 formed by the converging tapered wall surfaces 46 and 47. The wire ring 53 is split diagonally, as at 55 in FIG. 3, to render it expansible but still maintains a continuous continuity. In this manner, the ring maintains complete circular contact with the seal regardless of the force it expends on maintaining the seal surface 43 in good sealing contact with valve body surface 33.

Radial pressure exerted by the wire 53 is adjusted by means of a plurality of screws 61 which are threaded through openings 62 provided in the disc rings 23 and 24 formed when configuring the disc with contour surfaces 21 and 22. The screws 61 are positioned so as to engage with the wire ring 53 from the ins.de thereof. By adjusting the screws 61, the wire can be made to expand an equal amount in all radial directions, thus, moving the wire to exert an equal pressure in the seals 31 and 32 to provide the desired seal pressure against the contour surface 33 of the valve body.

For certain conditions of operation, the dual seals 31 and 32 of the valve 10 may be pressurized by fluid or by a semi-fluid material. To this purpose, the wire 53 and screws 61 would be eliminated and the chamber 66 behind the seals pressurized. This is accomplished by a passage 65 formed in the disc 14 which places the chamber 66 formed by the contour surface 33 of the valve body and the peripheral surface 67 of the disc 14 in communication with the space 69 between the seals. Fluid under pressure will be supplied to the chamber 66 from a port 68 formed in the wall of the valve body 11 90° from the shaft bores.

The embodiments of the invention in which an exclusive property or privilege is claimed are defined as follows:

1. In a butterfly valve having a valve body presenting a flow through passageway therein;

a spherical segment contour in the flow through passageway of the valve body;

a valve disc supported within the spherical segment contour in the fluid flow through passageway in the valve body for movement to a closed position to block fluid flow through the passageway or to an open position to permit the flow of fluid through said passageway, said valve disc having a concave upstream face surface and a concave downstream face surface to provide flow surfaces offering minimum resistance to fluid flow through passage when the valve disc is open;

a valve seal receiving groove in the peripheral edges of the concave edge surfaces of said valve disc, said valve seal receiving grooves being formed to present circular inwardly located capture grooves;

a valve seal of a non-elastomer material having exterior inclined wall surfaces terminating to form a relatively flat sealing surface adapted to engage the spherical contoured segment in the fluid flow through passageway, said valve seals also having circular radially outwardly entending bottom flange portions, said valve seals also being provided with a backside circular groove which in cross section presents a truncated triangle configuration having side walls so as to render said seals more readily deformable;

a split metallic ring of stainless steel material having continuous continuity disposed within said backside groove of each of said valve seals in contact only with the tapered side walls without fully entering the truncated groove and operable to exert a radial outwardly acting force on the side walls of said valve seals thereby causing the relatively flat contacting surface of said valve seals into intimate sealing engagement with the spherical contour segment surface of said fluid flow through passageway in said valve body;

a plurality of force applying screws threadedly engaged in the peripheral edges of said valve disc and in position to engage said split metallic ring to apply a force thereto to expand said metallic ring to thereby adjust the seal pressure of valve seals; and a single removable retainer ring for each valve seal operative to secure its associated valve seal within the associated groove in said valve disc in fluid sealing contact with the wall of the fluid flow through passageway in said valve body when said valve disc is in a closed position.

* * * * *